July 17, 1956 J. H. CRAWFORD, JR 2,754,520
CORNEAL IMPLANT
Filed Nov. 1, 1954

INVENTOR
JAMES H. CRAWFORD, JR.
BY Williamson, Williamson
Schroeder & Adams
ATTORNEYS

United States Patent Office 2,754,520
Patented July 17, 1956

2,754,520

CORNEAL IMPLANT

James H. Crawford, Jr., Watertown, S. Dak.

Application November 1, 1954, Serial No. 465,781

4 Claims. (Cl. 3—13)

This invention relates to correction of injured or defective eyes, and more particularly to a corneal implant in the nature of a biological window which can be permanently substituted for the damaged area in corneal tissue.

Occasionally the corneal tissue which overlies the fore part of the human eyeball becomes injured or a growth forms therein which will create opaque areas or growths in the cornea, and if such opaque or lumpy areas occur over the pupil, then the person thus afflicted will be blind or at least have his vision partially obscured. The means employed in present day practice by which damaged corneas can be repaired consists in substituting a carefully cut-out portion of the cornea with that of a donor which has been cut exactly to the same dimensions and configuration, generally circular or square, following which the newly grafted cornea is permitted to heal and form a transparent window through which the patient can see clearly. The operation is extremely critical and a high percentage of failures occurs because the corneal implant does not properly graft or will deteriorate, again becoming opaque.

It is an object of this invention to provide a simple corneal implant which can be properly substituted for a damaged area of the cornea.

It is another object of the invention to provide a corneal implant which will supplant a damaged portion of the cornea and provide a window mount for clear vision without requiring the transplanting of healthy tissue.

It is a further object of the invention to provide a grommet-type implant which will be simple and efficient to insert into the eyeball and which will be a permanent correction for vision impaired by corneal damage over the pupil of the eye.

These and other objects and advantages of the invention will more fully appear from the following description made in connection with the accompanying drawings, wherein like reference characters refer to the same or similar parts throughout the several views, and in which.

Figure 1:
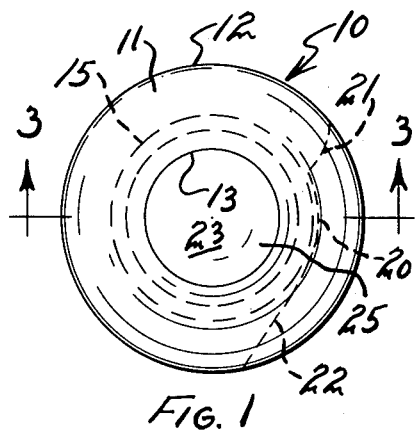
Fig. 1 is an enlarged plan view of my corneal implant device, hidden portions being shown in dotted line.

With continued reference to the drawing, my corneal implant is shown in plan view in Fig. 1 and consists of a grommet-type shape in integral form and indicated generally at 10. The grommet is formed in more particular with an outer curved annular plate or ring 11 which has a convex face at the outer portion thereof. The convex curvature may be in the form of a spherical segment or may be specially formed to match the surface characteristics of that portion of an eyeball to which the device will become attached. The annular plate or ring 11 has an outer periphery 12 and an inner periphery 13 as shown in Fig. 1. It is preferred that the plate or ring 11 be circular and that the peripheries 12 and 13 constitute circumferential edges. The plate or ring 11 is constructed of very thin material, preferably of a metallic substance known to be compatible with human tissue. I prefer tantalum which has extremely good compatibility with human tissue and will permit the healing of body cells while in direct contact with the metal.

Figure 2:
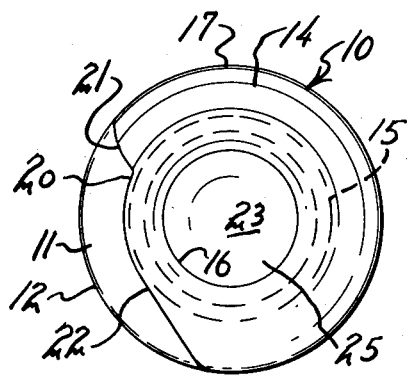
Fig. 2 is a rear view of the implant shown in Fig. 1.

My corneal implant also has a second curved annular plate or ring shown in detail at 14 in Fig. 2 at the reverse side from that of Fig. 1. The plate or ring 14 is preferably of the same thickness as that of plate 11 and has the same general convex surface facing in the same direction and conversely, a concave surface directed inwardly as shown in face view in Fig. 2. The cross-sectional appearance of the curvatures of both plates 11 and 14 appears in Fig. 3. The annular rings or plates 11 and 14 are arranged in close parallel spacing and may have formed therewith or secured thereto a ring or cylindrical member 15 which is attached medially to the respective plates or rings 14 and 11, lying intermediate the inner periphery 16 and outer periphery 17 of annular plate 14, and similarly between the inner periphery 13 and outer periphery 12 of plate 11. The ring or cylinder 15 is also constructed of a metal compatible with human tissue and is preferably formed integrally with the outer and inner annular plates with fillets 18 and 19 smoothly formed so as not to rupture or injure the delicate corneal tissue. Similarly, the outer peripheral edges 12 and 17 of the respective annular plates 11 and 14 are carefully formed so as not to rupture or injure the tissue of the eye structure. The inner annular ring or plate 14 has a notched periphery at 20 as shown in Fig. 2, the notch being preferably constructed so as to present a fairly abrupt edge 21 extending outwardly to the periphery 17 and a gradually curved edge 22 directed oppositely in a gradual slope to likewise reach the arcuate periphery 17. The edges 21 and 22 are rounded carefully so as to likewise prevent injury to the tissue of the eye when moved in contact therewith.

Figure 3:
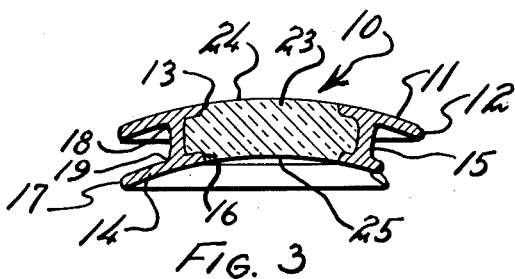
Fig. 3 is a cross-sectional view taken on the line 3—3 of Fig. 1 and looking in the direction of the arrows.

It will be noted that the annular plates or rings 11 and 14 have flange portions extending outwardly of the cylindrical portion 15 and also have flange portions extending smoothly and inwardly of the cylindrical body 15. The space defined medially of the cylindrical body 15 and coextensive between the inner flange portions of the inner and outer plates 11 and 14, is filled with a transparent window insert 23, as shown in Figs. 1, 2 and 3, the space between the flange portions of the plates constituting a gripping lock and sealing relation with the transparent window insert 23. The insert 23 may be constructed of glass or clear plastic and is preferably formed at the upper surface 24 in a convex curvature which will blend with that of the upper annular plate 11 and has an inner surface 25 preferably adapted to blend with and form a continuation of the concave surface presented by the inner annular plate 14. As noted previously, it is preferred that all of the parts constituting my corneal implant are firmly sealed together to prevent passage of air or fluid therethrough and further to prevent the accumulation of impure matter in any possible crevices formed between the parts.

Figure 4:
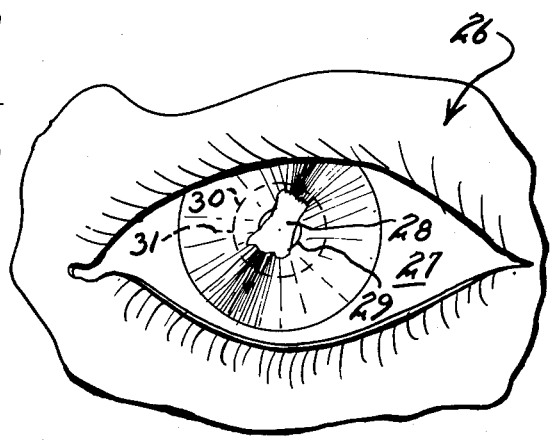
Fig. 4 is a segmental enlarged view of a human eye with damaged area indicated in the cornea and with the surgical cut line illustrated in dotted lines.

In the use of my corneal implant, it is contemplated that an otherwise healthy eye structure 26, as shown generally in Fig. 4, be selected for my implantation, the corneal tissue of the eye 26 overlying the eyeball 27 and having an imperfection such as the opaque area 28. In the instant case, the imperfection is such as to mainly obscure the vision of eye 26 over pupil 29 and sometimes opaquely covers the entire cornea.

The corneal tissue together with the opaque area 28 is removed by a circular incision at the dotted line 30 shown in Fig. 4. The circular piece of corneal tissue is then removed, exposing the eyeball 27 beneath the corneal tissue. A second surgical cut is then made from the peripheral edge of the tissue bounding the cut-out area so as to extend outwardly therefrom preferably at the position shown at 31 of Fig. 4.

My corneal implant is then brought to the prepared eye structure with the lower annular plate 14 in position to contact the surface of the marginal corneal tissue surrounding the cut-out area. The edge 21 is pressed lightly against the corneal tissue adjacent the cut or slit 31 and the implant is then slowly rotated so that the steep edge 21 will enter beneath the marginal tissue and circularly advance in this lowermost position underneath the corneal margin at the cut-out portion. When the corneal implant or grommet device has been rotated through most of a complete circle, the edge 22 will have followed and will lie above the cut 31 while the steep edge 21 will have advanced to a position just below the slit 31. The grommet is rotated in a clockwise direction to effect the insertion, but it is understood that the notched area might have its edges 21 and 22 reversed, in which case it would be appropriate to insert the edge 21 and rotate from the slit 31 in a counterclockwise direction in order to effect the implantation of the device.

Figure 5:
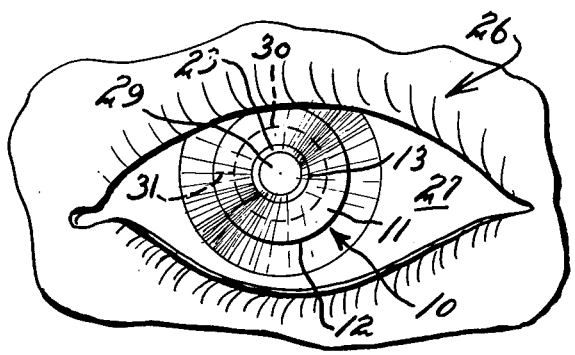
Fig. 5 is a similar view to that of Fig. 4 showing the corneal implant in permanent position in the cut-out area of the cornea.

When the corneal implant or grommet 10 is in position, the appearance will be as in Fig. 5, and the corneal slit 31 will heal with the grommet secured in position. It will be noted that the peripheral edge of the surgically cut area will line in an annular groove defined by the cylindrical body 15 and the outer parallel flanges of the respective upper and lower plates 11 and 14. It is contemplated that the spacing be such as to exactly accommodate the thickness of the cornea and the outer plate will be of such thin construction as to barely lie above the plane of the remainder of corneal tissue over the eyeball. The eye lids will, of course, open and close over the corneal implant in the same manner as in the case of an uninjured eye, and it is contemplated that the implant will be a permanent structure of lifetime duration, functioning all the while to provide an artificial window which has replaced a damaged cornea incapable of transmitting light in its original condition.

It will, of course, be understood that various changes may be made in the form, details, arrangement and proportions of the various parts without departing from the scope of my invention.

What is claimed is:

1. A biological window implant for positioning in an eyeball from which a damaged area of corneal tissue has been surgically removed and a slit formed outwardly of the periphery of the removed area, said implant comprising, a uniformly annular ring of thin material compatible with human tissue, a second ring of similar material in closely spaced relation with the first-mentioned ring and having a notched area formed at the outer periphery of said second ring for insertion into said slit of the corneal tissue, an interconnecting cylindrical body medially of the spaced parallel rings and maintaining said rings in sealed engagement therewith, and a transparent window insert disposed in sealed engagement medially of the cylindrical body and in sealed engagement with said rings, whereby the outer margins of the first-mentioned ring are adapted to overlie the circumferential margin of the surgically removed area and the second-mentioned ring is adapted to underlie the same margin with the transparent window insert operably disposed over the pupil of the eyeball.

2. A biological window implant for positioning in an eyeball from which a damaged area of corneal tissue has been surgically removed and a slit formed outwardly of the periphery of the removed area, said implant comprising, a convex annular thin plate constructed of tantalum or the like, a second convexly curved annular plate likewise constructed of tantalum and the like and adapted to underlie the first-mentioned plate in close parallel relation, an interconnecting circular body also constructed of tantalum or the like and rigidly maintaining said plates in their spaced parallel relation, and a transparent window insert disposed coextensively within said circular body and retained against displacement between said annular plates, said second-mentioned plate having a notched area formed in its outer periphery for engaging the surgical slit of the corneal tissue and permitting implantation by rotative movement of the implant with the respective annular plates lying above and below the peripheral margin of the surgically removed area and the transparent window overlying at least a portion of the pupil of the eyeball.

3. A biological window implant for positioning in an eyeball from which a damaged area of corneal tissue has been surgically removed and a slit formed outwardly of the removed area, said implant comprising a uniformly annular forward ring of thin material compatible with human tissue, a rearward ring of similar material in closely spaced relation with the forward ring and having a notched area formed at the outer periphery of said rearward ring for insertion into said slit of the corneal tissue, and a rigid interconnecting structure medially of the spaced rings, said interconnecting structure having a medial transparent area whereby the peripheral margin of the forward ring is adapted to overlie the circumferential margin of the surgically removed area and the rearward notched ring is adapted to underlie the same circumferential margin with the transparent area operably disposed over the pupil of the eyeball.

4. A biological window implant for positioning in an eyeball from which a damaged area of corneal tissue has been surgically removed and a slit formed outwardly of the periphery of the removed area, said implant comprising a convex annular thin plate constructed of tantalum or the like, a second convexly curved annular plate likewise constructed of tantalum or the like and adapted to underlie the first mentioned plate in close parallel relation, an interconnecting rigid and continuous body maintaining said plates in their spaced parallel relation and provided with a transparent area medially of both of said rings, said second mentioned plate having a notched area formed in its outer periphery for engaging the surgical slit of the corneal tissue and permitting implantation by rotative movement of the implant with the respective annular plates lying above and below the peripheral margin of the surgically removed area and the transparent area overlying at least a portion of the pupil of the eyeball.

References Cited in the file of this patent

UNITED STATES PATENTS 2,714,721   Stone _____ Aug. 9, 1955

OTHER REFERENCES

Gyorffy: "Acrylic Corneal Implant" (American Journal of Ophthalmology, vol. 34, No. 5, part 1, p. 757, May 1951).